(12) United States Patent
Bates et al.

(10) Patent No.: US 11,706,826 B2
(45) Date of Patent: Jul. 18, 2023

(54) METHODS AND SYSTEMS FOR DEPLOYING A PORTABLE COMPUTING DEVICE ON A TRANSPORTATION VEHICLE

(71) Applicant: Panasonic Avionics Corporation, Lake Forest, CA (US)

(72) Inventors: Steven Bates, Lake Forest, CA (US); Sanjiv Pimple, Irvine, CA (US); Philip S. Watson, Lake Forest, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 484 days.

(21) Appl. No.: 17/039,119

(22) Filed: Sep. 30, 2020

(65) Prior Publication Data
US 2022/0104289 A1 Mar. 31, 2022

(51) Int. Cl.
| | |
|---|---|
| *H04W 76/14* | (2018.01) |
| *H04W 4/42* | (2018.01) |
| *H04W 12/069* | (2021.01) |

(52) U.S. Cl.
CPC ............ *H04W 76/14* (2018.02); *H04W 4/42* (2018.02); *H04W 12/069* (2021.01)

(58) Field of Classification Search
CPC ..... H04W 76/14; H04W 4/42; H04W 12/069; H04W 12/08
See application file for complete search history.

(56) References Cited

U.S. PATENT DOCUMENTS

| | | | |
|---|---|---|---|
| 10,432,612 B2 | 10/2019 | Watson et al. | |
| 2004/0203803 A1* | 10/2004 | Taylor | H04L 67/02 455/445 |
| 2009/0034540 A1* | 2/2009 | Law | H04L 67/12 725/77 |
| 2011/0268096 A1* | 11/2011 | Lauer | H04B 7/18508 370/338 |
| 2017/0345064 A1* | 11/2017 | Bauman | G06Q 30/0277 |
| 2018/0027037 A1* | 1/2018 | Watson | H04L 67/568 709/219 |
| 2018/0027070 A1* | 1/2018 | Jhanji | H04L 67/1091 709/217 |
| 2018/0124040 A1* | 5/2018 | Watson | H04W 12/082 |

(Continued)

FOREIGN PATENT DOCUMENTS

WO   WO-2008029040 A2 *  3/2008  ............. H04L 67/04

*Primary Examiner* — John B King
(74) *Attorney, Agent, or Firm* — Loza & Loza, LLP; Tejinder Singh

(57) ABSTRACT

Methods and systems are provided for a transportation vehicle. One method includes assigning, by a processor, a host name for a portable computing device, configured to operate as an application server on an aircraft; providing a security certificate to the portable computing device; requesting, by the portable computing device, a secured, first network connection from an in-flight entertainment (IFE) system that interfaces with a plurality of devices on the aircraft via a second network connection; validating, by the IFE system the security certificate, and the host name; assigning, by the IFE system, a network access address to the portable computing device; mapping, by the IFE system, the network access address to the host name; and establishing the secured first network connection between the portable computing device and the IFE system.

20 Claims, 12 Drawing Sheets

(56) References Cited

U.S. PATENT DOCUMENTS

| | | | | |
|---|---|---|---|---|
| 2018/0317071 A1* | 11/2018 | Rabii | .................... | H04W 12/50 |
| 2020/0228350 A1* | 7/2020 | Rydkin | ................. | H04L 63/102 |
| 2021/0076215 A1* | 3/2021 | Grayson | ............. | H04L 63/0823 |
| 2021/0097893 A1* | 4/2021 | Klappert | ............. | G06F 16/9024 |

* cited by examiner

METHODS AND SYSTEMS FOR DEPLOYING A PORTABLE COMPUTING DEVICE ON A TRANSPORTATION VEHICLE

TECHNICAL FIELD

The present disclosure relates to transportation vehicles in general, and more particularly, to configuring a portable computing device as an application server for deployment on transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Typically, for security reasons, most aircraft equipment, even non-essential flight equipment, undergoes extensive safety testing (e.g. Radio Frequency testing, flammability testing, smoke testing or any other type of testing). The testing is conducted to certify that flight equipment will safe for flight. This testing/certification process increases the overall development and deployment cost for installing any flight equipment on aircrafts. One example of this challenge occurs, when one attempts to provide a new feature for an IFE system with new hardware. Adding the new hardware can be time consuming and expensive due to the qualification testing.

One option to solve the above challenge is to provide a portable computing device on the aircraft with new features/content via a public Wi-Fi network that enables passengers to access the new features/content from the portable computing device. This option has shortcomings because making the portable computing device available via the public Wi-Fi network makes it vulnerable to hacking. This is risky not only for airline data but also to passenger devices that access the public Wi-Fi network. Furthermore, because Wi-Fi access to passengers are typically open, the new feature may not be available, should the Wi-Fi network become overloaded with other passenger data.

Another shortcoming of the foregoing option is based on when the feature/content provided by the portable computing device needs its own internet access. This makes the portable computing device more vulnerable to hacking attacks.

One way to avoid using the Wi-Fi network is to plug the portable computing devices to an existing IFE system via a wired connection. This puts the IFE system to security risks, because the portable computing device is repeatedly removed & plugged-in from a same network port, which places the same network port at risk by malicious hackers.

Continuous efforts are being made to develop computing and network technologies to enable a portable computing device to operate as an application server without jeopardizing security and without extensive development and deployment costs.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
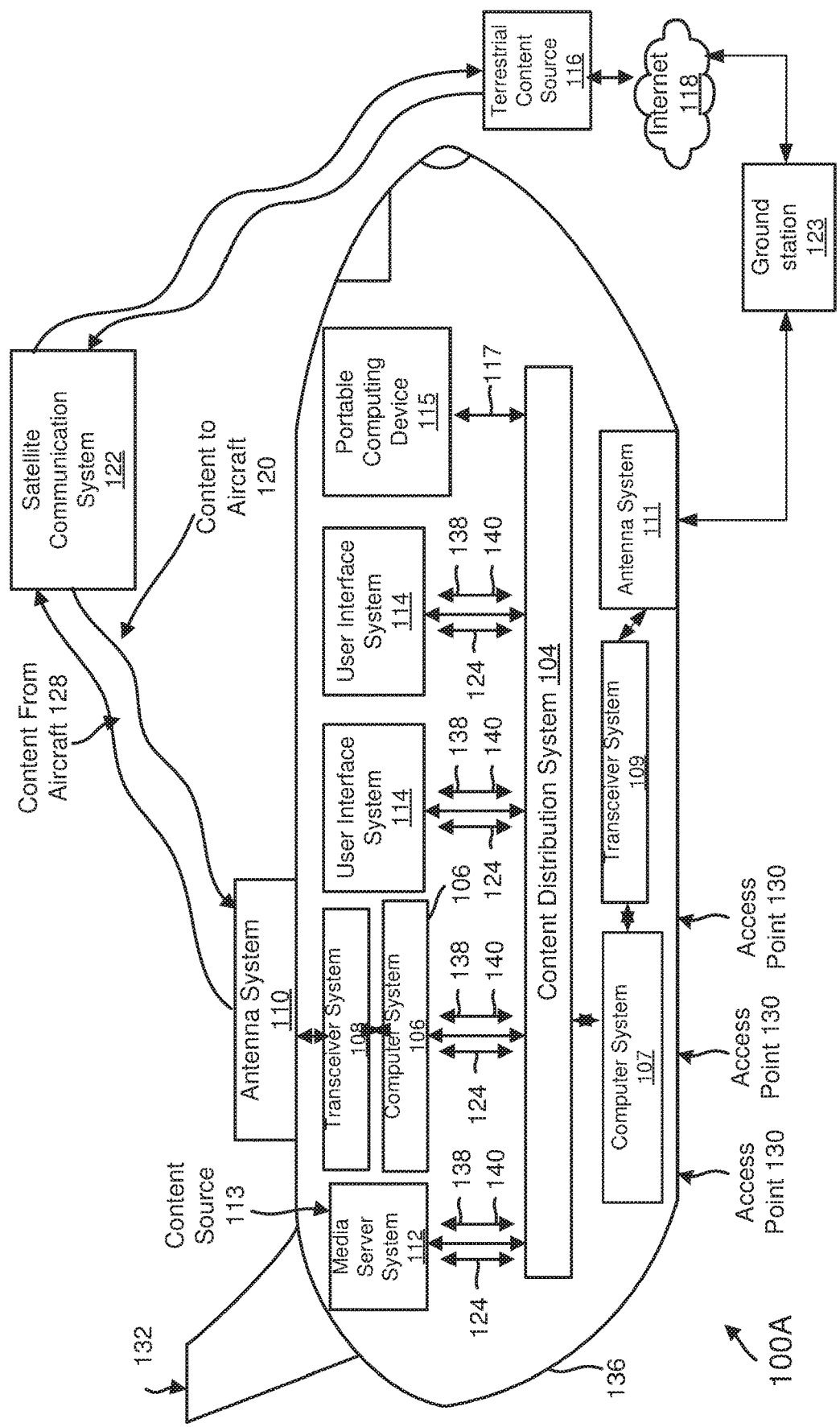
FIG. 1A shows an example of an operating environment for implementing the various aspects of the present disclosure on an aircraft.

In one aspect, innovative technology is disclosed for providing application, content and features from a portable computing device, configured as an application server on transportation vehicles, including aircrafts, ships, trains, busses and other vehicle types. The examples illustrating the innovative technology are based on aircrafts but can be implemented on other vehicle types. It is noteworthy that the terms application, content, and features may be used interchangeably throughout this specification.

In one aspect, a dedicated secured network (e.g. a Wi-Fi) is created for the portable computing device on an aircraft. The portable computing device is assigned a unique identifier, e.g. a host name. The network is configured to use the state-of-the-art security measures, e.g. the portable computing device is configured to store security certificates that comply with WPA (Wireless Protection Alliance) credentialed programs, including WPA2 enterprise class security using Public Key Infrastructure (PKI) certificates. This ensures that only a secured and authorized device can connect to aircraft computing systems using an approved security certificate, signed by a certification authority trusted by an in-flight entertainment (IFE) system.

To establish the dedicated network connection, the portable computing device is first authenticated using the WPA2-Enterprise methodology. Upon proper authentication, the IFE system assigns a pre-configured network access address (e.g. an Internet Protocol (IP) address) to the portable computing device. The IP address is mapped to a pre-configured unique hostname by the IFE system. It is noteworthy that multiple dedicated portable devices can be deployed, identified by their unique hostnames, each portable computing device configured to provide a service (e.g. an application/content or any other feature). This enables to better load balance availability of applications and content on the aircraft. Although the various examples below describe the use of a single portable device, the technology disclosed herein can be deployed for multiple portable computing devices.

In one aspect, the IFE system is pre-configured to map one or more services (i.e. application, content or features) to the portable computing device's hostname. The IFE system allows personal electronic devices (PEDs) and seat devices to communicate with the portable computing device using a separate network connection, as described below. In one aspect, restrictive firewall rules are implemented to allow access to specific applications, content and features from the portable device.

In another aspect, to enable updates to the portable computing device, the IFE system maintains an access control list (ACL) (or white list) that allows the portable computing device to communicate with designated ground devices.

In yet another aspect, a crew device is configured with security credentials similar to the portable computing device. Using the security credentials, the crew device establishes a separate and secured connection with an IFE system. The crew device is then enabled to communicate with the portable computing device as a "peer". Details of using the crew device with the portable computing device are also provided below.

As a preliminary note, the terms "component", "module", "system", and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Vehicle Information System: FIG. 1A shows an example of a generic vehicle information system 100A (also referred to as system 100A) that can be configured for installation aboard an aircraft 132, according to one aspect of the present disclosure. In one aspect, as described below in detail, system 100A uses innovative computing technology for enabling a portable computing device 115 (may also be referred to as "device 115") to connect to an IFE system using a dedicated secured network connection 117 (e.g. a Wi-Fi network connection). As described below in detail, the device 115 operates as an application server. In this configuration, device 115 provides application updates, content updates or other features to one or more passenger electronic devices (PEDs) and seat devices. Details of device 115 are provided below with respect to FIG. 3A-3B, and details of processes describing the innovative technology of the present disclosure are described below with respect to FIGS. 4A-4F.

When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, Calif., the assignee of this application.

In addition to device 115, system 100A may also include one or more content source 113 and one or more user (or passenger) interface systems (may also be referred to as a seat device/seatback device/IFE device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing preprogrammed content and/or downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a ground station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the ground station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, the terrestrial content source 116 can be configured to communicate with other terrestrial content sources (not shown). The terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a PED to receive and view content via a wireless access point 130, described below in detail. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

The various hardware systems of FIG. 1A, e.g. antenna systems 110/111, media server 112, transceivers 108/109, computer systems 106/107, user interface 114, and components of the content distribution system 104 described below with respect to FIG. 2 have to undergo extensive qualification testing for deployment. To deploy new hardware to provide updates to existing content or new features can hence be expensive and time consuming. To overcome this challenge, device 115 is configured to securely communicate with the IFE system using a dedicated network. The IFE system enables controlled access to application updates, content and feature sets from device 115 to passengers, as described below in more detail.

Figure 1B:
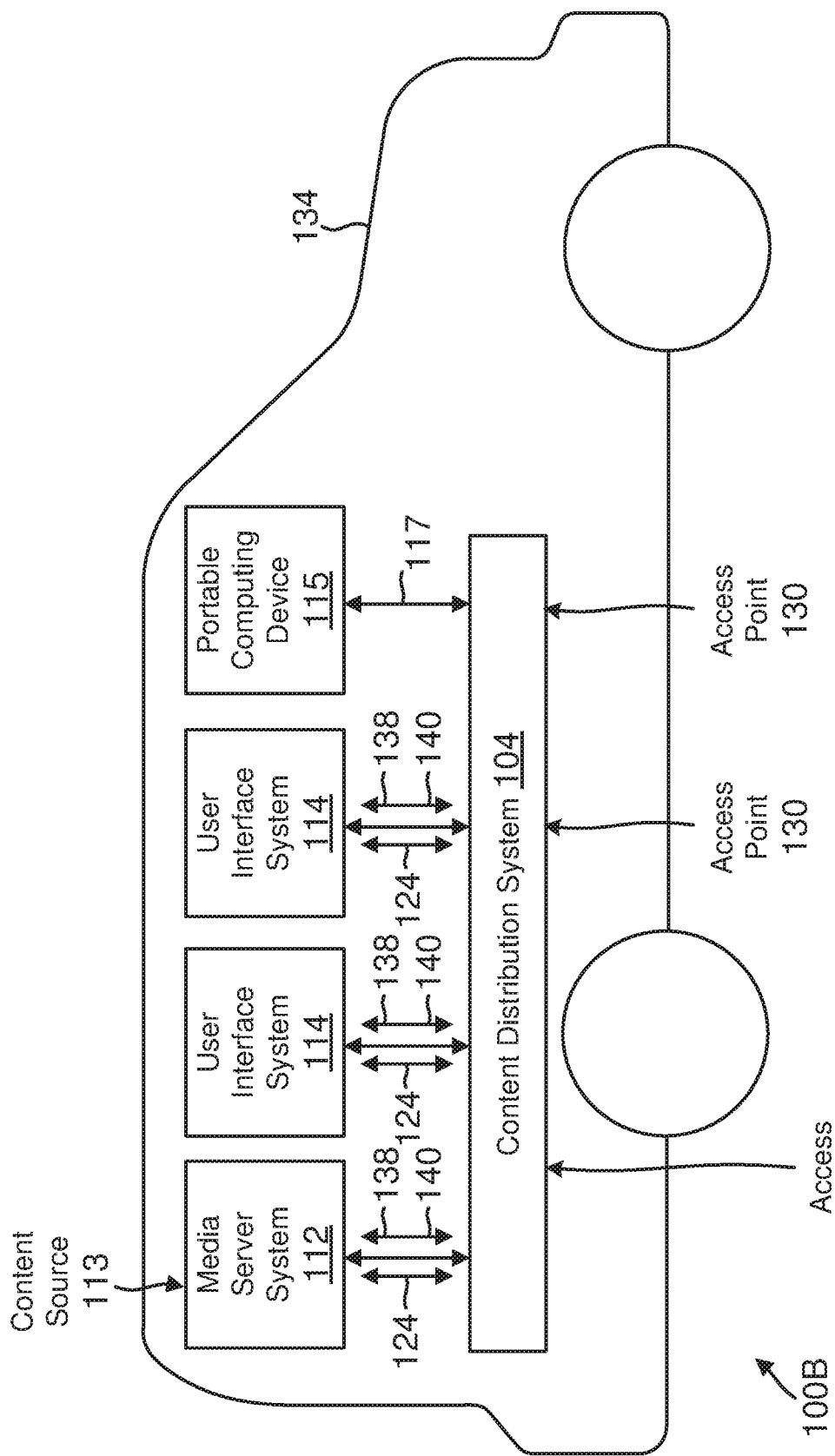
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114. In another aspect, device 115 coupled to the server system 112 via a dedicated secured network connection 117, for e.g. a Wi-Fi connection provides content to the content distribution system 104, as described below in detail.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

Figure 2:
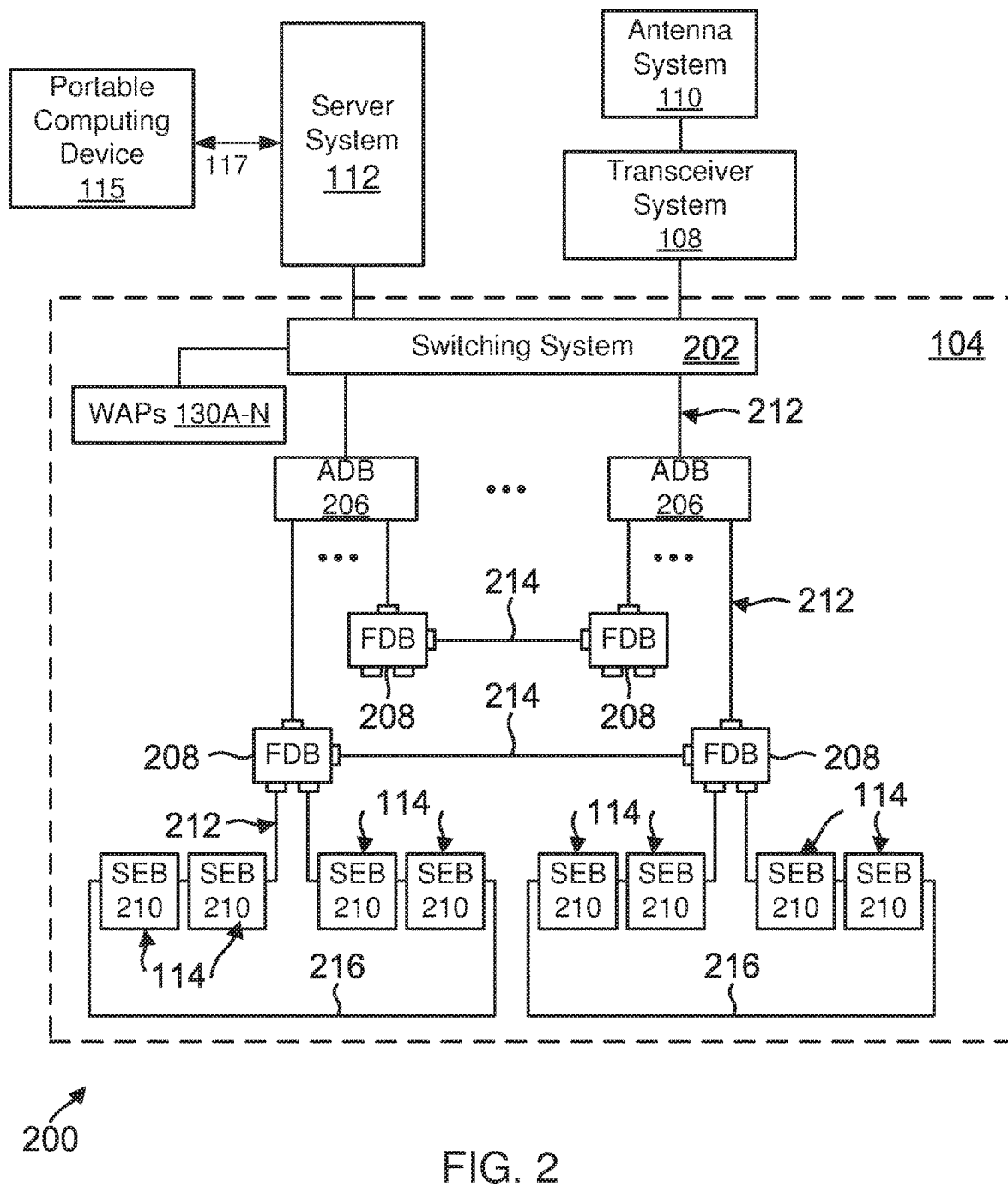
FIG. 2 shows an example of a content distribution system, used according to one aspect of the present disclosure.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
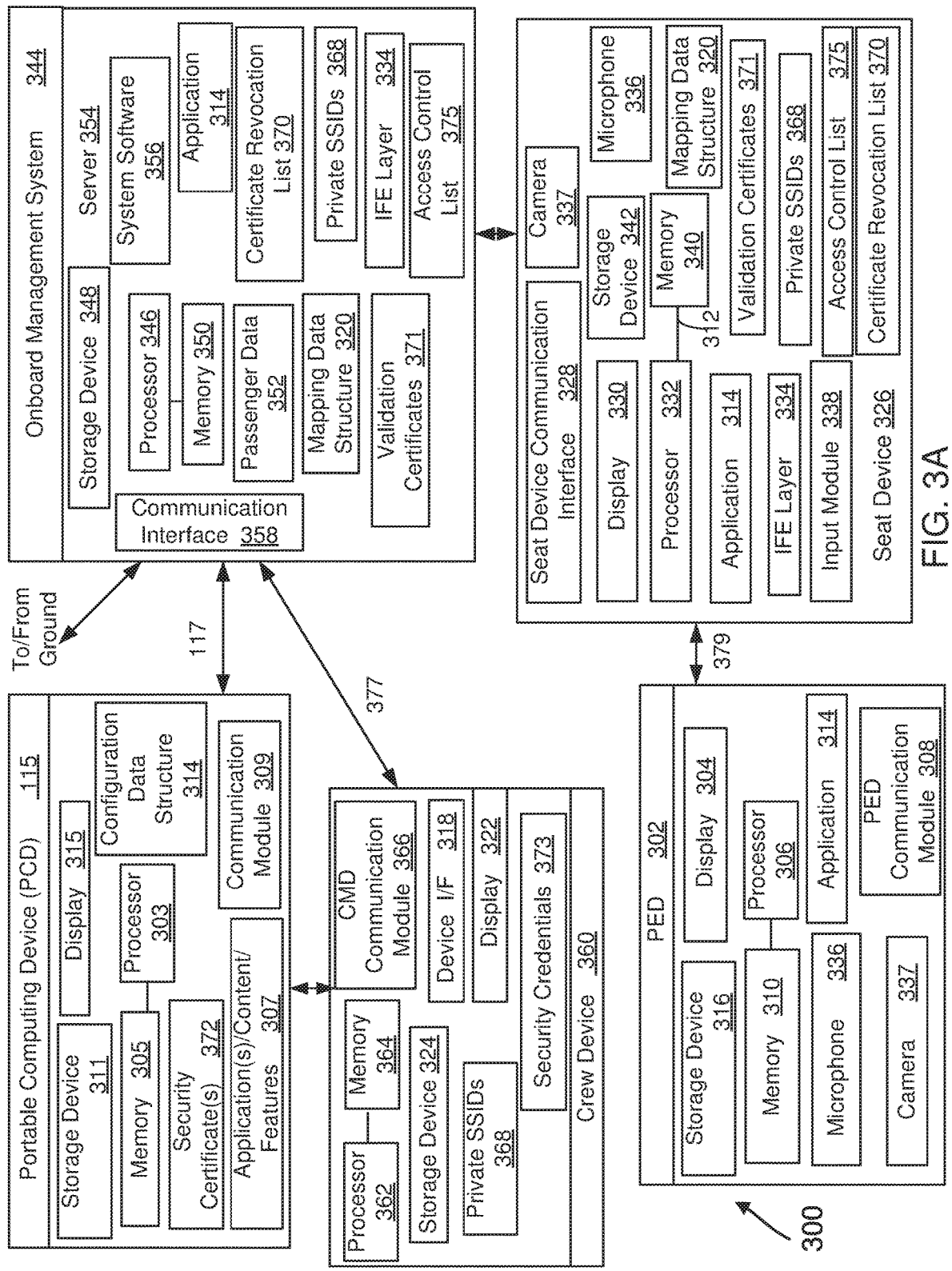
FIG. 3A shows an example of a system for deploying a portable computing device as an application server, according to one aspect of the present disclosure.

System 300: FIG. 3A shows an example of a system 300 having device 115 that may be configured to operate as an application server and uses the secure network connection 117 to communicate with an aircraft system (e.g. an onboard management system 344 executing an IFE layer, may also be referred to as the IFE system), according to one aspect of the present disclosure. As an example, device 115 maybe a laptop, a notebook, or any other computing device that can be brought on the aircraft, without extensive qualification testing and configured to operate as an application server, as described below.

In one aspect, device 115 may include a processor 303 that has access to a memory 305 via a bus system/interconnect (not shown) for executing stored instructions out of a memory 305. Processor 303 may be, or may include, one or more programmable, hardware based, general-purpose or special-purpose microprocessors, digital signal processors (DSPs), programmable controllers, application specific integrated circuits (ASIC s), programmable logic devices (PLDs), or the like, or a combination of such hardware devices.

Device 115 may also include a storage device 311 that maybe or may include any storage medium for storing data in a non-volatile manner, such as a flash device or any other storage device types. In one aspect, device 115 stores one or more security certificates 372 in the storage device 311. The security certificates 372 may include a WPA2-enterprise level client certificate that is used to establish the secured network connection 117 with the IFE system presented by the onboard management system 344.

In one aspect, the storage device 311 may also store a configuration data structure 314. The configuration data structure includes an identifier, e.g. a unique host name (314A, FIG. 3B). The host name is pre-assigned by an authorized entity, e.g. an airline or the IFE system provider, before the device 115 is deployed on the aircraft.

In another aspect, device 115 also stores one or more application(s)/content/features 307 at storage device 311. Applications/content/features may be jointly or individually referred to as application 307. In one aspect, application 307 represents processor executable instructions that may provide a feature to another device or any other electronic content. In one aspect, a hyperlink (e.g. 314B) to access application 307 may be pre-assigned and stored at the configuration data structure 314.

In one aspect, to establish the secured network connection 117, device 115 uses a communication module 309 to communicate with the onboard management system 344, according to one aspect of the present disclosure. It is noteworthy that although a single block is shown for the communication module 309 for convenience, the communication module 309 may have different interface logic and circuitry to comply with different communication protocols/standards. Details of configuring and using device 115, as a secured application server are provided below.

In one aspect, system 300 also includes, the onboard management system 344, a seat device 326, a PED 302, when authorized, and a crew device (may be referred to as "CMD") 360, when authorized. In another aspect, system 300 may not include the seat device 326 but includes the PED 302. In yet another aspect, system 300 includes the CMD 360 and the PED 302 or the CMD 360 and the seat device 326, respectively.

In one aspect, the onboard management system 344 includes a server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, a mapping data structure 320 (may also be referred to as data structure 320), a certificate revocation list (CRL) 370, validation certificates 371, an access control list (ACL) (or a white list) 375, private SSIDs (service set identifiers for private wireless connections) 368, media content, applications and program files, including system software 356, application 314, and others.

Figure 3B:
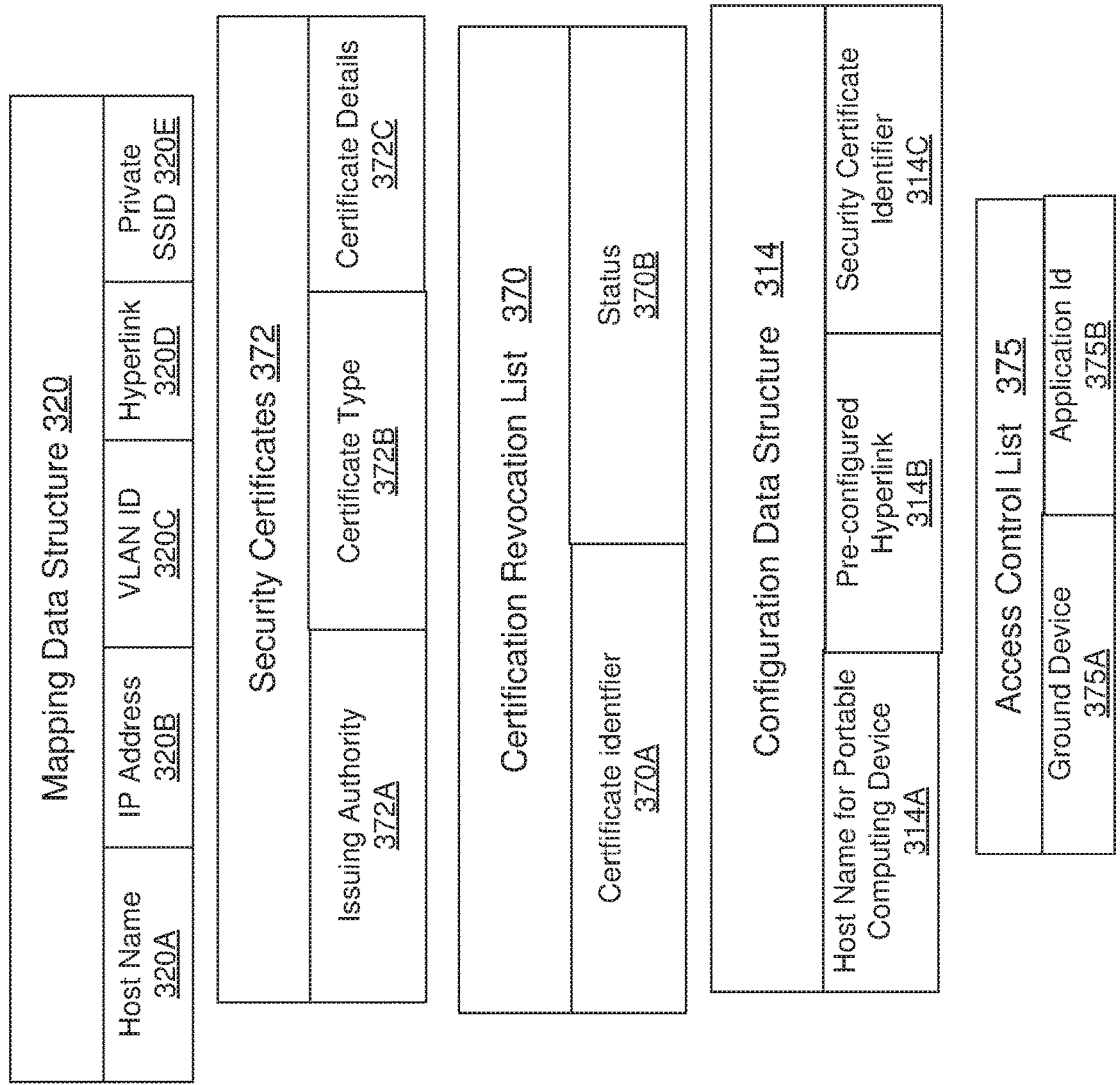
FIG. 3B shows a block diagram of data structures used by the system of FIG. 3A, according to one aspect of the present disclosure.

The mapping data structure 314 is configured to store the host name of device 115, an IP address (320B, FIG. 3B) that is mapped to the host name (314A, FIG. 3B), a network identifier (e.g. a virtual local area network (VLAN) identifier 314C, FIG. 3B) that identifies a dedicated network between device 115 and server 354, a hyperlink (320D, FIG. 3C) that maps the host name to application 307, and a private SSID (320E, FIG. 3C) from among the private SSIDs 368 used to establish the network connection 117.

In one aspect, the ACL 375 identifies a ground device (375A, FIG. 3B) that device 115 is authorized to interface with. ACL 375 may also include an application identifier/content identifier/feature identifier, jointly referred to as application ID (375B, FIG. 3B) that is used to enable access by a PED or seat device to access application 307, as described below in detail.

In one aspect, the CRL 370 identifies a security certificate 372 and includes a status indicator (370B, FIG. 3B) indicating that the certificate has been revoked. The CRL 370 is used to verify if a certificate has been revoked before authorizing network connection 117, as described below in detail.

In one aspect, system software 356 is executed by the processor 346 to control the overall operation of the server 354. Application 314 may be downloaded from server 354 by passengers using an authorized PED 302 paired with the seat device 326 and/or server 354 for accessing digital content.

In one aspect, the onboard management system 344 maintains flight and passenger data 352 (may also be referred to as data 352), for example, flight itinerary including origin location, layover locations, destination location, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with device 115, CMD 360, PED 302 and/or seat device 326 via a communication interface 358. It is noteworthy that the connection between server 354 and device 115 is secured and dedicated, as described below in more detail. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect, the seat device 326 may be configured to store the validation certificates 371, the private SSIDs 368, the mapping data structure 320, and ACL 375 described above with respect to server 354. The various data structures may be stored for redundancy.

In another aspect seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and vides and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options to users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In another aspect, the seat device 326 may also execute the application 314 that may be used by the passenger to view media content or various computing functions that are enabled by the seat device 326. The application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, server 354 communicates with the CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone (not shown) for receiving a voice input. CMD 360 may also include a camera (not shown) for taking pictures or making a video. The CMD 360 may also include a storage device 324 that may be may include any storage medium for storing data in a non-volatile manner, such as one or more magnetic or optical based disks, flash memory, or solid-state drive. The storage device 316 may be used to store a device interface 318, may also be referred to as a "crew management interface (CMI)" 318 that may be executed out of memory 364.

The CMI 318 enables the CMD 360 to interface with the onboard management system 344 via a CMD communication module 366. The CMD 360 may present one or more APIs to the onboard management system 344 to retrieve passenger/flight data and update data structure 320. The non-limiting API format and syntax will depend on the protocols used by the CMD 360 and the onboard management system 344.

In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In yet another aspect, CMD 360 stores private SSIDs 368 and security credentials 373 at storage device 324. The security credentials 373 may be similar to the security certificates 372. The private SSIDs 368 and the security credentials are used to establish a dedicated network connection 377 with the server 354. This enables CMD 360 to establish, a peer-to-peer network communication with the device 115, as described below in detail.

In one aspect, the PED 302 is securely paired with the seat device 326 and can access content from device 115 via a network connection 379 that is separate from the dedicated network connection 117 between device 115 and the onboard management system 344. The term "pair" means that PED 302 is associated and authenticated by the seat device 326 and/or server 354 to send and receive information.

As an example, the PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving a voice input from a passenger. The voice input can be converted into text by application 314 for processing. In another aspect, PED 302 also includes a camera 337 that may be used by a passenger to upload a video.

The PED 302 includes a storage device 316 that may be or may include any storage medium for storing data in a non-volatile manner, such as one or more magnetic or optical based disks, flash memory, or solid-state drive. The storage device 316 may be used to store content displayed on a display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content from device 115, as well as to communicate with CMD 360.

As an example, application 314 may be made available for download and installation via a public repository such as that maintained respectively under the trademark GOOGLE PLAY by Google, Inc. and/or the APP STORE maintained by Apple Inc. (without derogation to any third party trademark rights). In addition, application 314 may be provided for download by an airline carrier on a website or from the onboard management system 344.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

Data Structures: FIG. 3B provides examples of various data structures mentioned above with respect to FIG. 3A that are used by the various innovative aspects of the present disclosure. In one aspect, the mapping data structure 320 may be stored by server 354. A copy of the mapping data structure 320 may also be stored at one or more seat devices 326. In one aspect, the mapping data structure 320 is encrypted and maybe stored at a protected or a "hidden" segment of the storage device 348. As an example, the mapping data structure 320 stores a host name 320A, an IP address 320B, a VLAN identifier 320C, a pre-configured hyper link 320D and a private SSID 320E. The host name 320A is the host name that is assigned to device 115. The IP address 320B is mapped to the host name 320A. The IP address 320B is from a range of IP addresses for a private VLAN identified by VLAN ID 320C that is configured for the private SSID 320E. The private SSID 320E is selected from the private SSIDs 368 for a dedicated network connection. In one aspect, for multiple device 115, the mapping data structure 320 will store the various fields described above for each device 115.

In one aspect, security certificates 372 (and security credentials 373 for CMD 360) may identify a certificate issuing authority 372A, indicate a certificate type 372B and provide other certificate details 372C that enables server 354 to validate the security certificates using validation certificates 371.

In another aspect, the CRL 370 stores a certificate identifier 370A and a status indicator 370B indicating whether a specific certificate is revoked. Server 354 uses the CRL 370 to permit a network connection request by device 115, as described below in detail.

In yet another aspect, the configuration data structure 314 stores a pre-assigned host name 314A for device 115. The configuration data structure 314B may also include a pre-configured hyperlink 314B (also shown as 320D in data structure 320) that can be presented to passengers to access any content, application or feature via device 115 operating as an application server. The configuration data structure may also include a security certificate identifier 314C that identifies a security certificate 372 for the host name 314A.

In yet another aspect, ACL 375 identifies an authorized ground device 375A that can communicate with device 115 to update content. The ACL 375 also identifies an application 307 by an application identifier 375B. This indicates to the server that application 307 can be accessed via the hyperlink 314B (or 320B), as described below in detail.

It is noteworthy that the various aspects of the present disclosure are not limited to any specific data structure fields. the number of data structures or the format of the data structure. The various data structures may be stored in one or more relational databases or independent objects identified by unique object identifiers. The various aspects described herein can be implemented with fewer or more fields shown in FIG. 3B, and the actual implementation may involve fewer or more data structures.

Figure 4A:
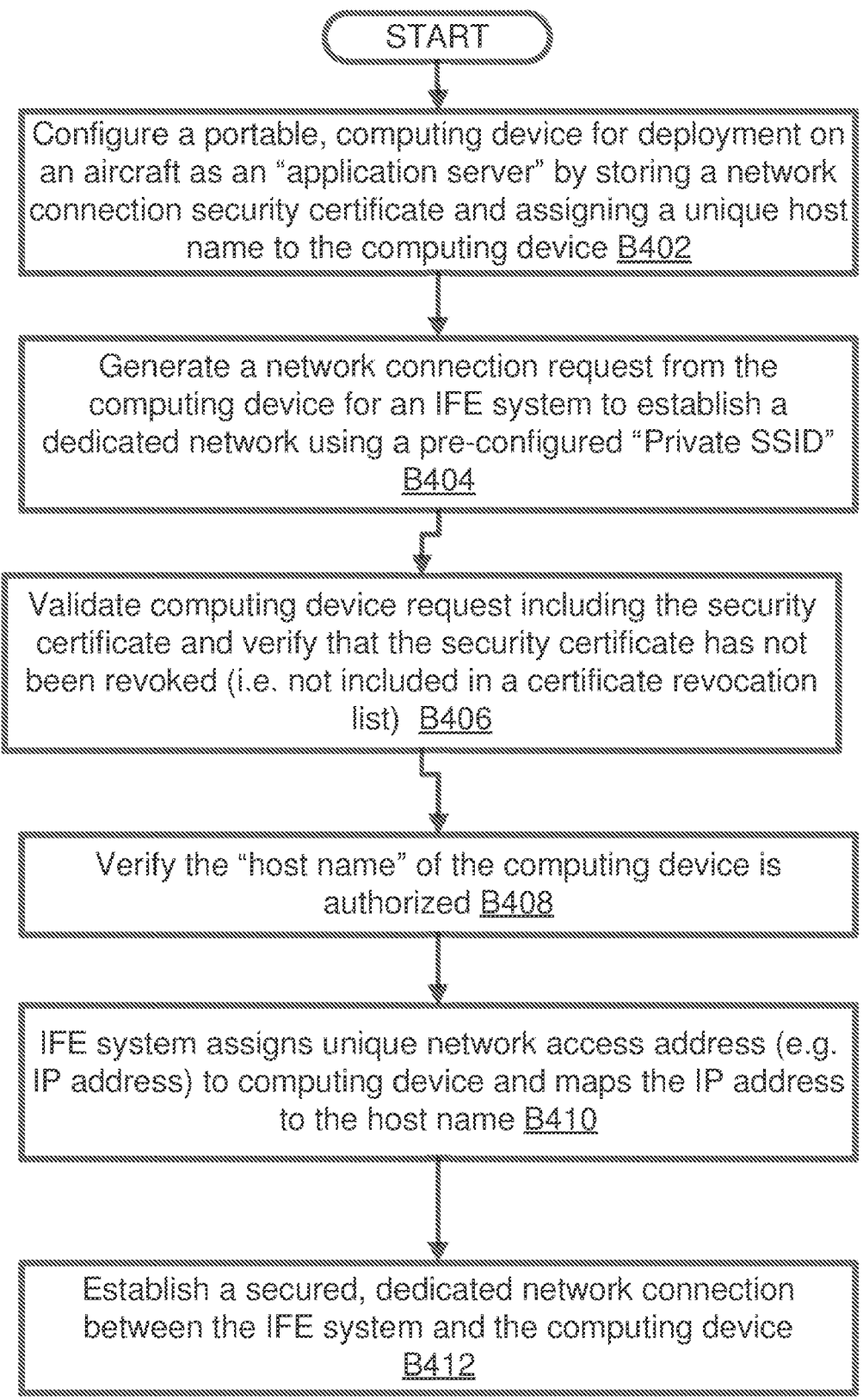
FIG. 4A shows a process flow diagram for enabling a portable computing device as an application server, according to one aspect of the present disclosure.

Process Flows: FIG. 4A shows a process 400 for configuring device 115 and establishing a secured network connection 117 between device 115 and the IFE system (i.e. onboard management system 344 executing the IFE layer 334), according to one aspect of the present disclosure. The process begins in block B402, when device 115 is configured for deployment as an application server. The term application server as used herein means a computing device that can present a new application, update an existing application installed on an aircraft, provide new content or update content stored on the aircraft, provide new feature sets, e.g. access to a new shopping site or gaming site, or provide any other information to PED 302 and/or seat device 326. A security certificate (e.g. 372, FIG. 3B) is stored at storage 311 (FIG. 3A) of device 115. A unique host name (e.g. 314A) is also assigned to device 115 to uniquely identify device 115.

In block B404, device 115 requests a network connection for establishing a dedicated network. The request uses a private SSID 368 that is broadcast by the server 354.

In block B406, in response to receiving the network connection request, server 354 validates the security certificate 372 using validation certificates 371. The server 354 also checks CRL 370 to ensure that the security certificate for the network connection request has not been revoked. In block B408, the server 354 also verifies the host name 314B of device 115. The host name may be stored by server 354 within the mapping data structure 320 or any other data structure, e.g. a database that stores pre-assigned host names. The adaptive aspects of this disclosure are not limited to any specific manner of storing the host name by server 354.

In block B410, server 354 assigns a network access address (e.g. IP address 320B, FIG. 3B) to device 115. The IP address is assigned from a reserved IP address range that is maintained by the server 354 for the private SSIDs 368. The assigned IP address is then mapped to the host name 320A (also shown as 314A in the configuration data structure 314, FIG. 3B). Thereafter, in block B412, a secured network connection is established between device 115 and the onboard management system 344. The network connection information is stored at the mapping data structure 320 including the IP address 320B, the private SSID 320E for the network connection 317 and the VLAN identifier 320C that identifies the secured, private VLAN between device 115 and server 354.

Figure 4B:
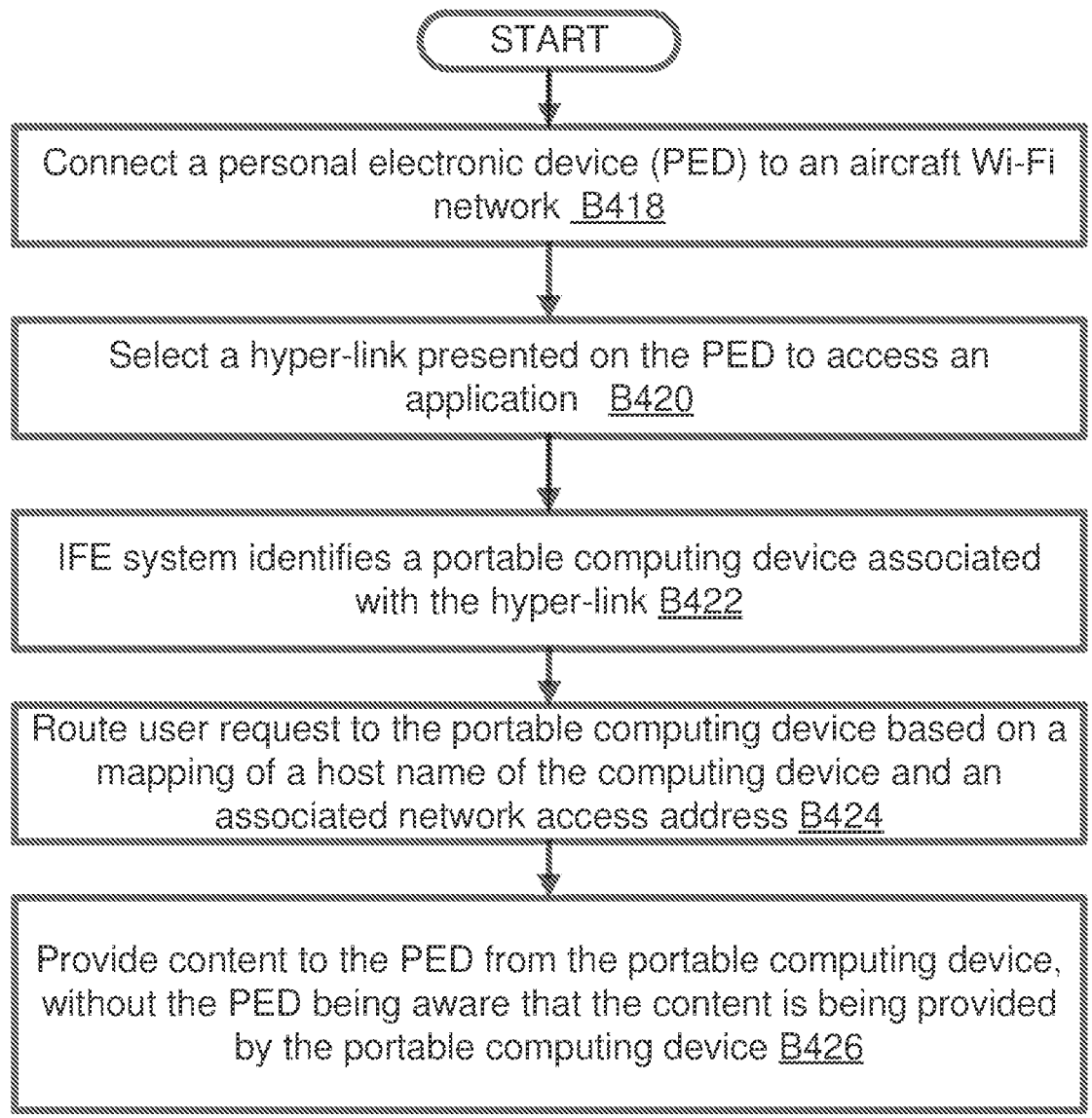
FIG. 4B shows a process flow diagram for enabling peer-to-peer communication between an electronic device and the portable computing device, according to one aspect of the present disclosure.

FIG. 4B shows a process 416 that enables a PED 302 to access content/features available at device 115 operating as an application server, according to one aspect of the present disclosure. The process begins in block B418, when the PED 302 connects to a Wi-Fi network provided on the aircraft. In one aspect, the PED 302 is paired to the seat device 326 to connect to the Wi-Fi network. The pairing involves, the PED 302 sending a request to the seat device 326 and the seat device 326 authenticating the request based on passenger data 352. In another aspect, the PED 302 connects to the Wi-Fi network without pairing to the seat device 326. A pre-configured, hyperlink (314B/320D (FIG. 3B) is presented to the PED 302 via a user interface. The hyperlink is selected in block B420 to access an application that is made available by device 115. The hyperlink is provided to server 354. In response to the selection, in block B422, server 354 identifies device 115 as being associated with the hyperlink. In one aspect, the mapping data structure 320 is used to identify the device 115. In block B424, the request is routed to device 115 based on the host name 320A and the IP address 320B. The requested content is provided to the PED 302 in block B424. It is noteworthy that the PED 302 is unaware that the requested content is coming from device 115.

Figure 4C:
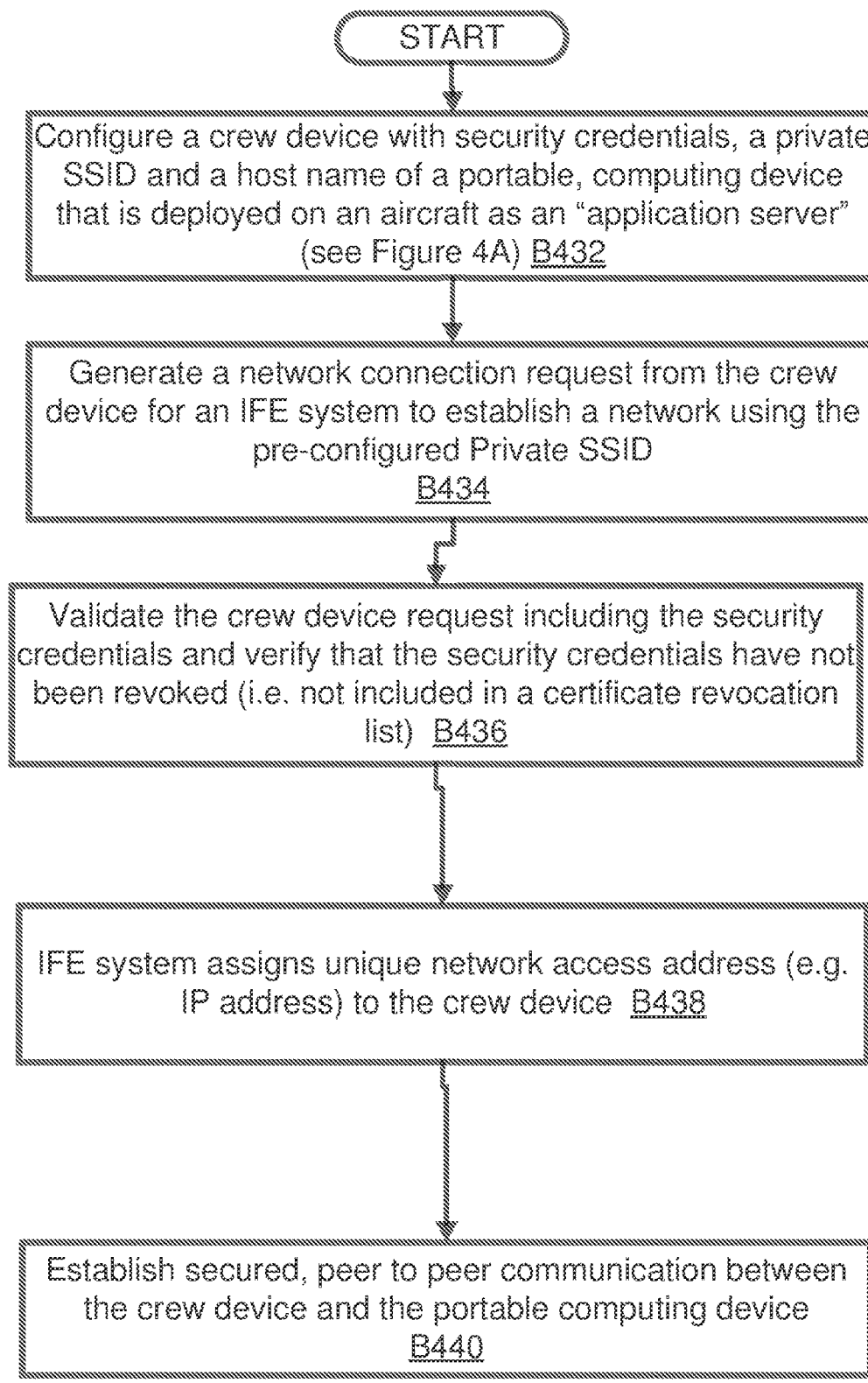
FIG. 4C shows a process flow for enabling peer-to-peer communication between a crew device and the portable computing device, according to one aspect of the present disclosure.

FIG. 4C shows a process 430 for configuring a crew device (e.g. CMD 360, FIG. 3A) to establish peer-to-peer communication device 115, according to one aspect of the present disclosure. The process begins in block B432, when CMD 360 stores security credentials 373. The security credentials 373 are similar to the security certificates 372 of device 115. A private SSID is pre-configured by the server 354 and associated with the security credentials 373. CMD 360 is also configured with the host name of device 115.

In block B434, the CMD 360 presents the security credentials and a request for a dedicated network connection 377 using the pre-configured SSID. In block B436, the server 354 validates the security credentials using the validation certificates 371 and ensures that the credentials have not been revoked based on its status in CRL 370. In block B438, a unique IP address is assigned to the CMD 360. This IP address is selected from a range of IP addresses that are reserved for a private VLAN associated the private SSID used by the CMD 360. This ensures that the connection 377 to the CMD 360 is secured, similar to the connection 117 with device 115, described above with respect to FIG. 4A. Thereafter, in block B440, the CMD 360 can communicate with the device 115 using secured peer-to-peer communication.

Figure 4D:
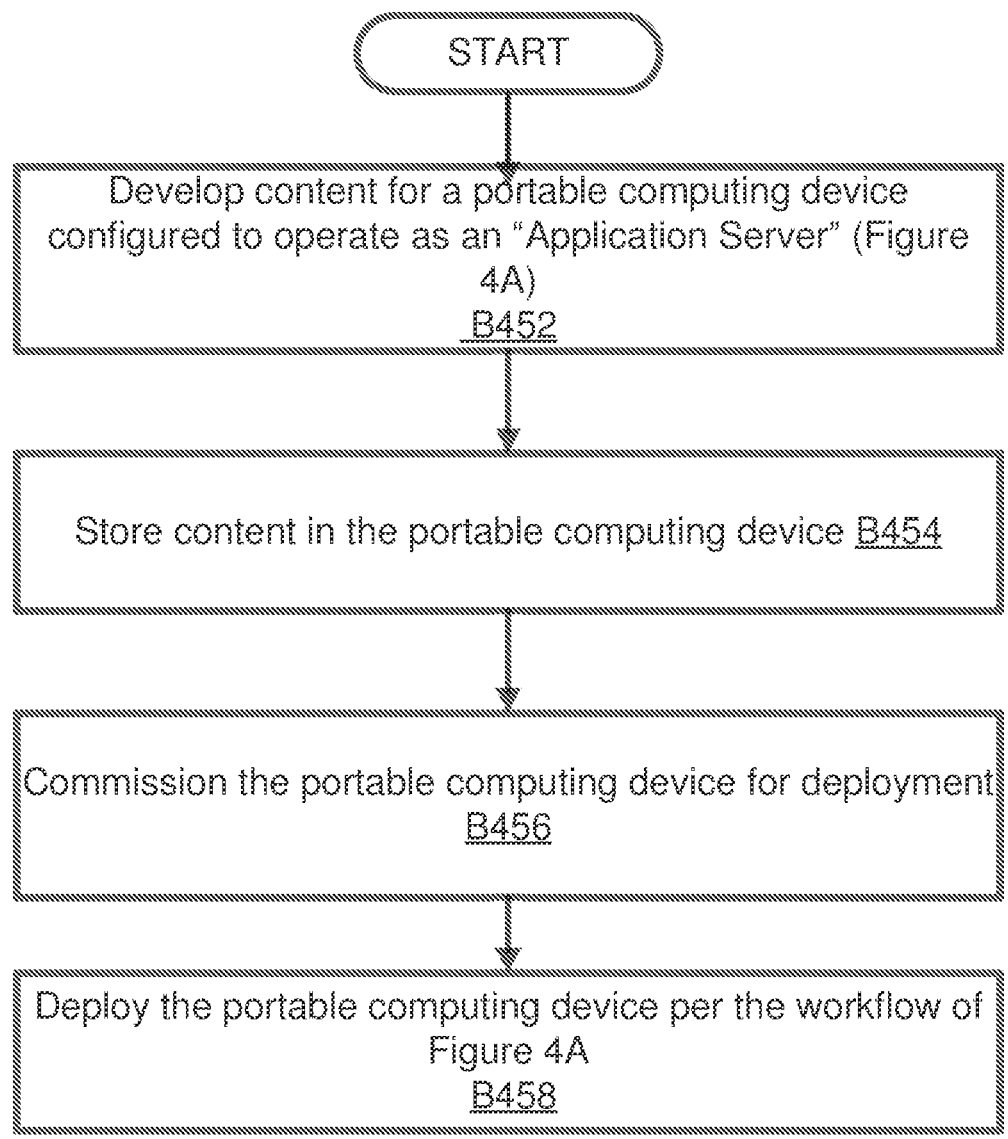
FIG. 4D shows a process flow for securely updating content in the portable computing device in an offline mode, according to one aspect of the present disclosure.

FIG. 4D shows a process 450 for securely loading content on device 115 before the device 115 is deployed on the aircraft, according to one aspect of the present disclosure. Process 450 begins in block B452, when an application owner (e.g. an airline or any other entity) designs, develops and tests any changes to an existing application or develops a new application. This includes content that is delivered to passengers. In block B454, the application/content is stored at storage device 311 of device 115. This may be performed at a secured installation center managed by the airline, the IFE provider or any other authorized third party. In block B456, the device is commissioned on the aircraft and deployed in block B458 using the process of FIG. 4A.

Figure 4E:
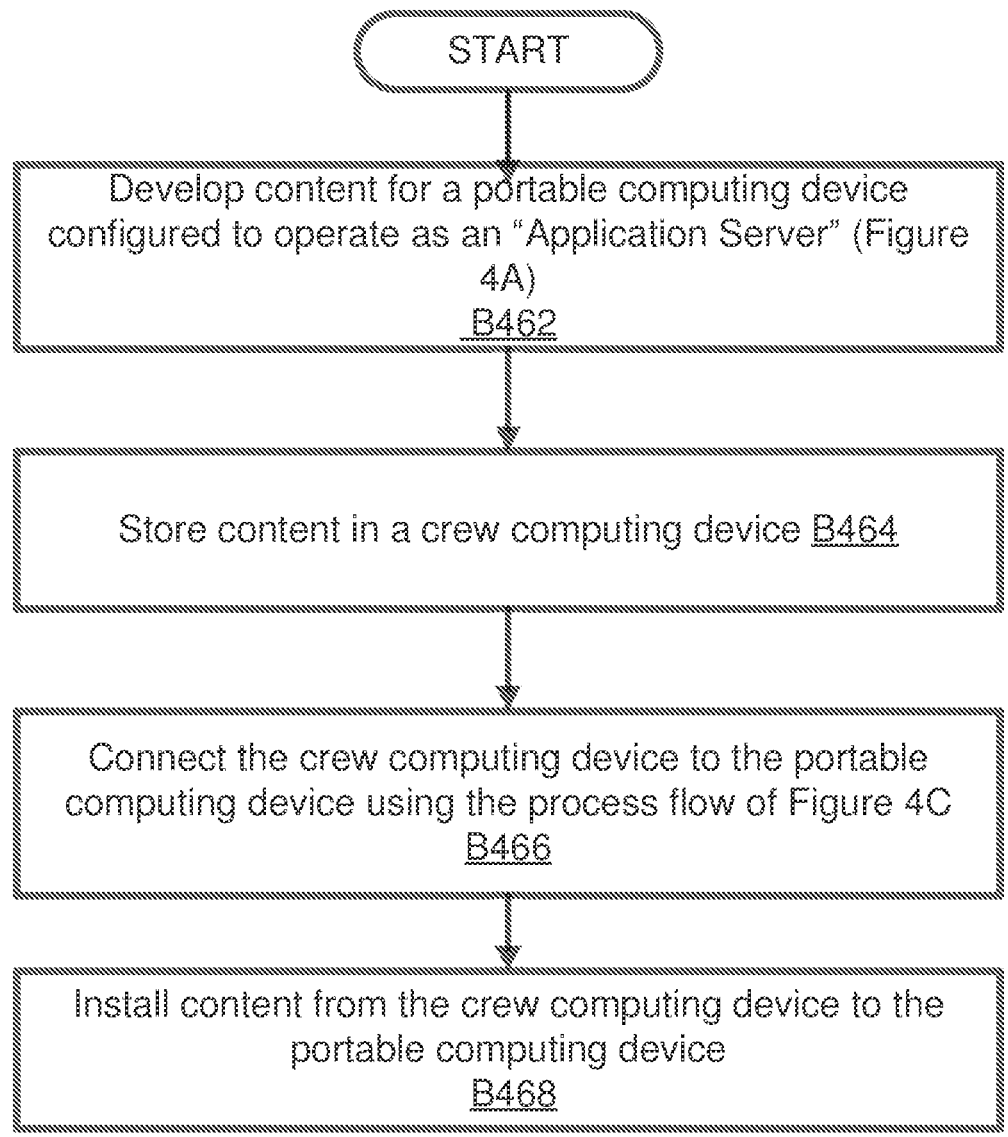
FIG. 4E shows a process flow for securely updating content in the portable computing device in an online mode, according to one aspect of the present disclosure.

FIG. 4E shows a process 460 for an "online" mode to update application/content in device 115, according to one aspect of the present disclosure. Process 460 begins in block B462 when an application owner (e.g. an airline or any other entity) designs, develops and tests any changes to an existing application or develops a new application. This includes update to content that is delivered to passengers. In block B464, the updated content and updates to the application are stored in CMD 360. In block B466, the CMD 360 establishes a peer-to-peer connection with device 115 using the process of FIG. 4C. Thereafter, in block B468, using the peer-to-peer connection, the CMD 360 transfers the stored updates to device 115.

Figure 4F:
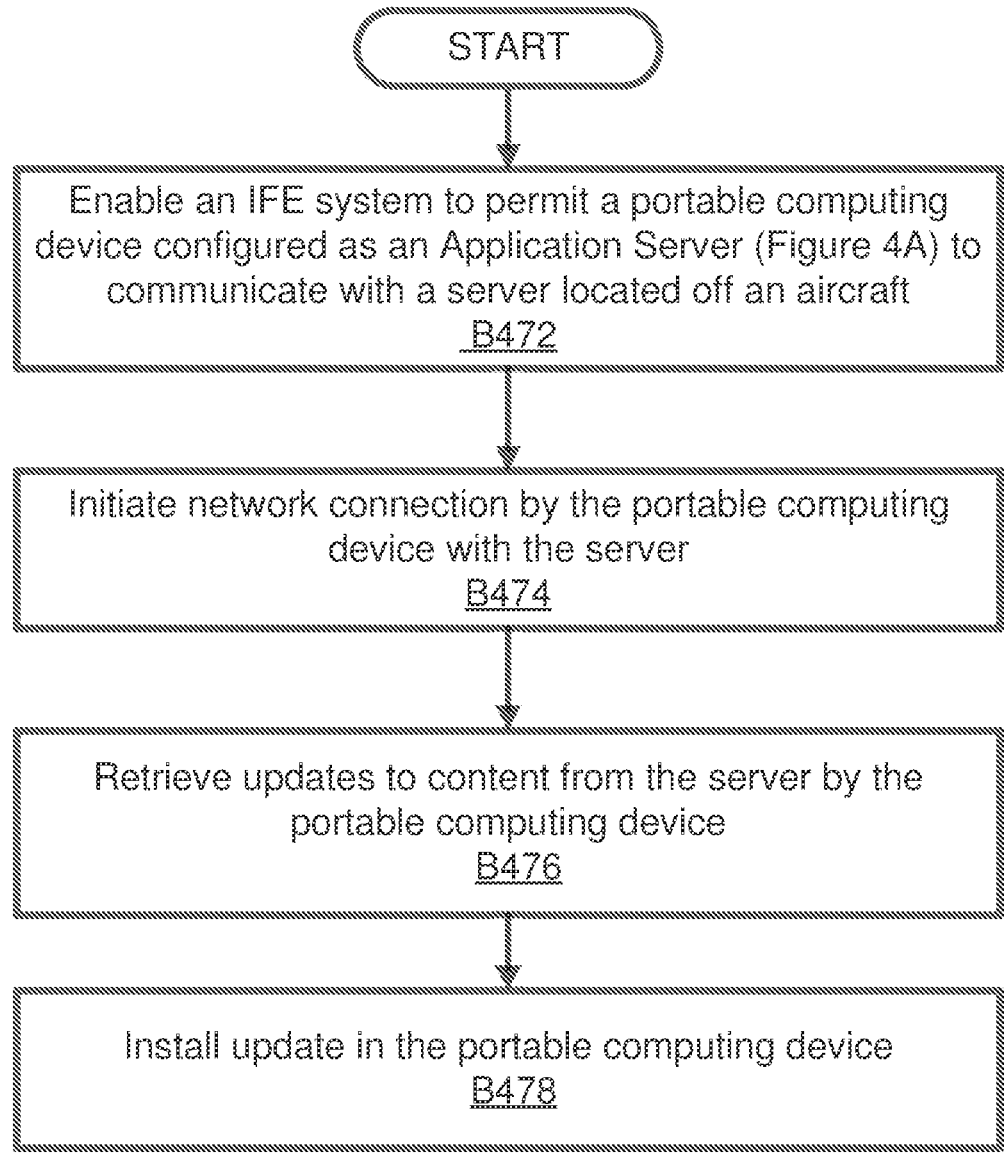
FIG. 4F shows a process flow for securely updating content in the portable computing device using a remote device, according to one aspect of the present disclosure.

FIG. 4F shows a process 470 that enables device 115 to update application/content from a designated device that is remote to the aircraft, e.g. a ground server (not shown), according to one aspect of the present disclosure. Process 470 begins in block B472, when server 354 executing the IFE layer 334 is pre-configured to allow device 115 to communicate with a ground device. The identity of the ground device is stored in ACL 375 or the mapping data structure 320. In block B474, device 115 initiates a network connection with the ground device. The network connection maybe for a satellite-based connection, a cellular modem, an airport Wi-Fi connection or any other communication means. In block B476, updates to application/content are retrieved from the ground device and installed in block B478 using connection 117 that was established by the process of FIG. 4A.

In one aspect, methods and systems are provided for a transportation vehicle. One method includes assigning, by a processor, a host name for a portable computing device, configured to operate as an application server on an aircraft (B402, FIG. 4A); providing a security certificate to the portable computing device (B402, FIG. 4A); requesting (B404, FIG. 4A), by the portable computing device, a secured, first network connection from an in-flight entertainment (IFE) system (server 354, FIG. 3A executing the IFE layer 334) that interfaces with a plurality of devices on the aircraft via a second network connection; validating (B406, FIG. 4A), by the IFE system, the security certificate and the host name; assigning (B410, FIG. 4A), by the IFE system, a network access address to the portable computing device; mapping (B410, FIG. 4A), by the IFE system, the network access address to the host name; and establishing (B412, FIG. 4A) the secured first network connection between the portable computing device and the IFE system.

In another aspect, a method is provided. The method includes: pairing (B418, FIG. 4B), by an in-flight entertainment (IFE) system, an electronic device via a first network connection; connecting a portable computing device, configured to operate as an application server, to the IFE system via a dedicated second network connection (117, FIG. 3B); presenting (B420, FIG. 4B), by the electronic device, an option on the electronic device with an embedded link to access the portable computer; verifying (B422, FIG. 4B), by the IFE system, that the embedded link is valid, upon receiving an input via the option; transmitting (B424, FIG. 4B), by the IFE system, the input to the portable computing device, transparent to the electronic device; and receiving (B426, FIG. 4B), by the electronic device, content from the portable computing device, unaware that the content is sent by the portable computing device.

The technology disclosed herein provides a technical solution for securely enabling access to application/content/ features on an aircraft (or any other vehicle). A portable computing device does not have to undergo qualification testing and can be used to operate as an application server. This expedites availability of new features and content for passengers without having to expend resources in qualifying the portable computing device.

Figure 5:
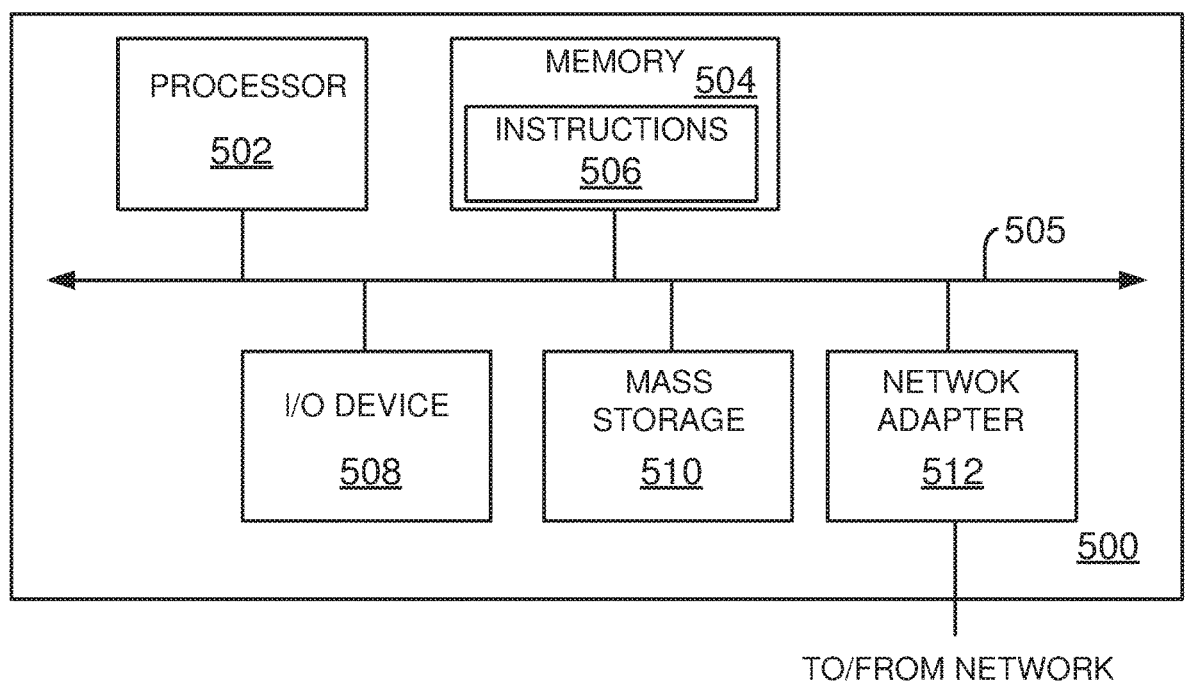
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent device 115, CMD 360, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to the process steps of FIGS. 4A-4F as well as the data structures of FIG. 3B, described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for deploying a portable computing device on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
pairing, by an in-flight entertainment (IFE) system, an electronic device via a first network connection;
connecting a portable computing device, configured to operate as an application server, to the IFE system via a dedicated second network connection; wherein the portable computing device is connected by assigning a host name to the portable computing device; providing a security certificate to the portable computing device; validating, by the IFE system, the security certificate and the host name; assigning, by the IFE system, a network access address to the portable computing device; and mapping, by the IFE system, the network access address to the host name for establishing the dedicated second network connection;
presenting, by the electronic device, an option with an embedded link to access the portable computing device computer;
verifying, by the IFE system, that the embedded link is valid, upon receiving an input via the option;
transmitting, by the IFE system, the input to the portable computing device, transparent to the electronic device; and
receiving, by the electronic device, content from the portable computing device, unaware that the content is sent by the portable computing device.

2. The method of claim 1, wherein the dedicated second network connection includes a virtual local area network, separate from the first network connection between the IFE system and the plurality of devices.

3. The method of claim 2, wherein the dedicated second network connection is a wireless connection.

4. The method of claim 1, further comprising:
requesting, by the portable computing device, the dedicated second network connection from the IFE system.

5. The method of claim 4, wherein the network access address is an Internet Protocol ("IP") address.

6. The method of claim 1, wherein validating, by the IFE system, the security certificate further comprising:
determining, by the IFE system that a certificate revocation list does not include the security certificate of the portable computing device.

7. The method of claim 1, wherein the network access address is part of a range of network access addresses reserved by the IFE system for a private service set identifier (SSID) for the dedicated second network connection.

8. A non-transitory machine-readable storage medium having stored thereon instructions for performing a method, comprising machine executable code which when executed by at least one machine, causes the machine to:

pair, by an in-flight entertainment (IFE) system, an electronic device via a first network connection;

connect a portable computing device, configured to operate as an application server, to the IFE system via a dedicated second network connection; wherein the portable computing device is connected by assigning a host name to the portable computing device; providing a security certificate to the portable computing device; validating, by the IFE system, the security certificate and the host name; assigning, by the IFE system, a network access address to the portable computing device; and mapping, by the IFE system, the network access address to the host name for establishing the dedicated second network connection;

present, by the electronic device, an option with an embedded link to access the portable computing device;

verify, by the IFE system, that the embedded link is valid, upon receiving an input via the option;

transmitting, by the IFE system, the input to the portable computing device, transparent to the electronic device; and receive, by the electronic device, content from the portable computing device, unaware that the content is sent by the portable computing device.

9. The non-transitory machine-readable storage medium of claim 8, wherein the dedicated second network connection includes a virtual local area network, separate from the first network connection between the IFE system and the plurality of devices.

10. The non-transitory machine-readable storage medium of claim 8, wherein the dedicated second network connection is a wireless connection.

11. The non-transitory machine-readable storage medium of claim 8, wherein the machine executable code which when executed by at least one machine, further causes the machine to: request, by the portable computing device, the dedicated second network connection from the IFE system.

12. The non-transitory machine-readable storage medium of claim 8, wherein the network access address is an Internet Protocol ("IP") address.

13. The non-transitory machine-readable storage medium of claim 8, wherein the machine executable code which when executed by at least one machine, further causes the machine to: determine, by the IFE system that a certificate revocation list does not include the security certificate of the portable computing device.

14. The non-transitory machine-readable storage medium of claim 8, wherein the network access address is part of a range of network access addresses reserved by the IFE system for a private service set identifier (SSID) for the dedicated second network connection.

15. A system comprising: a memory containing machine readable medium comprising machine executable code having stored thereon instructions; and a processor coupled to the memory, the processor configured to execute the machine executable code to:

pair, by an in-flight entertainment (IFE) system, an electronic device via a first network connection;

connect a portable computing device, configured to operate as an application server, to the IFE system via a dedicated second network connection; wherein the portable computing device is connected by assigning a host name to the portable computing device; providing a security certificate to the portable computing device; validating, by the IFE system, the security certificate and the host name; assigning, by the IFE system, a network access address to the portable computing device; and mapping, by the IFE system, the network access address to the host name for establishing the dedicated second network connection;

present, by the electronic device, an option with an embedded link to access the portable computing device;

verify, by the IFE system, that the embedded link is valid, upon receiving an input via the option;

transmitting, by the IFE system, the input to the portable computing device, transparent to the electronic device; and receive, by the electronic device, content from the portable computing device, unaware that the content is sent by the portable computing device.

16. The system of claim 15, wherein the dedicated second network connection includes a virtual local area network, separate from the first network connection between the IFE system and the plurality of devices.

17. The system of claim 15, wherein the dedicated second network connection is a wireless connection.

18. The system of claim 15, wherein the machine executable code further causes the processor to: request, by the portable computing device, the dedicated second network connection from the IFE system.

19. The system of claim 15, wherein the machine executable code further causes the processor to: determine, by the IFE system that a certificate revocation list does not include the security certificate of the portable computing device.

20. The system of claim 15, wherein the network access address is part of a range of network access addresses reserved by the IFE system for a private service set identifier (SSID) for the dedicated second network connection.

* * * * *